United States Patent [19]

Satoh

[11] Patent Number: 4,843,805
[45] Date of Patent: Jul. 4, 1989

[54] LAWN MOWER

[75] Inventor: Masatoshi Satoh, Tokyo, Japan

[73] Assignee: Kioritz Corporation, Tokyo, Japan

[21] Appl. No.: 53,027

[22] Filed: May 20, 1987

[30] Foreign Application Priority Data

May 24, 1986 [JP] Japan .............................. 61-78614[U]

[51] Int. Cl.⁴ .......................................... A01D 34/70
[52] U.S. Cl. ...................................... 56/202; 56/16.6
[58] Field of Search ................... 56/202, 320.2, 16.4, 56/16.6

[56] References Cited

U.S. PATENT DOCUMENTS

| Re. 24,955 | 3/1961 | Campbell | 56/202 |
| 3,872,656 | 3/1975 | Dahl | 56/202 |
| 4,149,363 | 4/1979 | Woelffer | 56/16.6 |
| 4,203,276 | 5/1980 | Plamper | 56/16.6 |
| 4,214,424 | 7/1980 | Gobin | 56/16.6 |

Primary Examiner—Paul J. Hirsch
Attorney, Agent, or Firm—Browdy and Neimark

[57] ABSTRACT

A lawn mower is provided with a door which closes the opening at the rear end of a mowed grass discharge duct when a mowed grass catcher bag is not mounted on the rear of the duct. The door is also capable of serving as a member for mounting the bag when the door opens the opening of the duct.

4 Claims, 3 Drawing Sheets

LAWN MOWER

BACKGROUND OF THE INVENTION

1. Field of the Invention

The present invention relates to a lawn mower having a mowing blade rotatably provided in the lower side of a machine body, a duct for discharging mowed grass which is formed in the upper side, and a mowed grass catcher bag provided on the rear side of the duct for collecting the mowed grass.

2. Description of the Prior Art

In a lawn mower of this type, an engine is mounted on the machine body, the mowing blade is rotatably driven by the engine, and grass mowed by the mowing blade is discharged through the mowed grass discharge duct extending toward the rear of the machine body into the mowed grass catcher bag mounted on the rear side of the duct. The lawn mower of this type moves on wheels which are provided in the machine body and are connected to the engine through a driving device including a transmission and clutch.

A conventional lawn mower of this type, however, has the following problems. If the machine is carelessly operated when the bag is not mounted onto a mowed grass discharge port formed at the outlet end of the duct, there is the danger that mowed grass and gravel or the like mixed therewith may be discharged directly from the exposed discharge port to the outside, or someone might carelessly put their hand in the discharge port. In order to prevent this danger, a door for closing the discharge port has conventionally been provided. However, the generally-known arrangement of the door is such that, when the bag is to be mounted on mounting members of the discharge port, the operator has to open the door with one hand while holding the bag in the other before he can fit the bag onto the port. In addition, because the dimensions of the discharge port of the duct are limited and hence are not large relative to the whole structure of the mowed grass discharge section of the machine, the opening from which the mowed grass caught in the bag is discharged cannot be made large.

SUMMARY OF THE INVENTION

The present invention has been accomplished in order to solve the above-mentioned problems and to integrate the door and the members provided on the discharge port for mounting the mowed grass catcher bag. The present invention provides a lawn mower which is provided with a simple structure of the portion for mounting and dismounting the bag, a large opening of the bag, and a reduction in the number of component parts, and is thus able to ensure stable operation.

In order to provide the above-described lawn mower, the present invention is characterized by an arrangement of a lawn mower provided with a door which closes an opening at the rear end of a mowed grass discharge duct when a mowed grass catcher bag is dismounted, and the door is also capable of serving as a member for mounting the mowed grass catcher bag when the door opens the opening of the duct.

That is, with the arrangement in accordance with the present invention, since the door provided for preventing exposure of the mowed grass discharge port of the duct during the operation of the machine without the bag is also able to serve as a mounting member for the bag, the door opens and closes the discharge port automatically in response to the mounting and dismounting of the bag on the discharge port and, simultaneously, an opening of the bag can be made larger than the discharge port of the duct, thus facilitating the discharge of grass from the bag by tilting the bag. Therefore, by virtue of this arrangement in which the door acts to open and close the mowed grass discharge port and simultaneously serves as both a member for mounting the mowed grass catcher bag and as a lid member for the opening of the mowed grass discharge duct, the lawn mower in accordance with the present invention is capable of preventing any discharge of mowed grass directly from the discharge port if the machine is carelessly operated, and also is capable of achieving an easy discharge of mowed grass from the bag, and a reduction in the number of component parts. Thus, the lawn mower is suitable for mass-production and, hence, is inexpensive, light, and compact. In addition, the lawn mower facilitates maintenance and enables safe and easy operation even by an inexperienced operator.

BRIEF DESCRIPTION OF THE DRAWINGS

The drawings show an embodiment of a lawn mower in accordance with the present invention, in which.

DESCRIPTION OF THE PREFERRED EMBODIMENT

Figure 1:
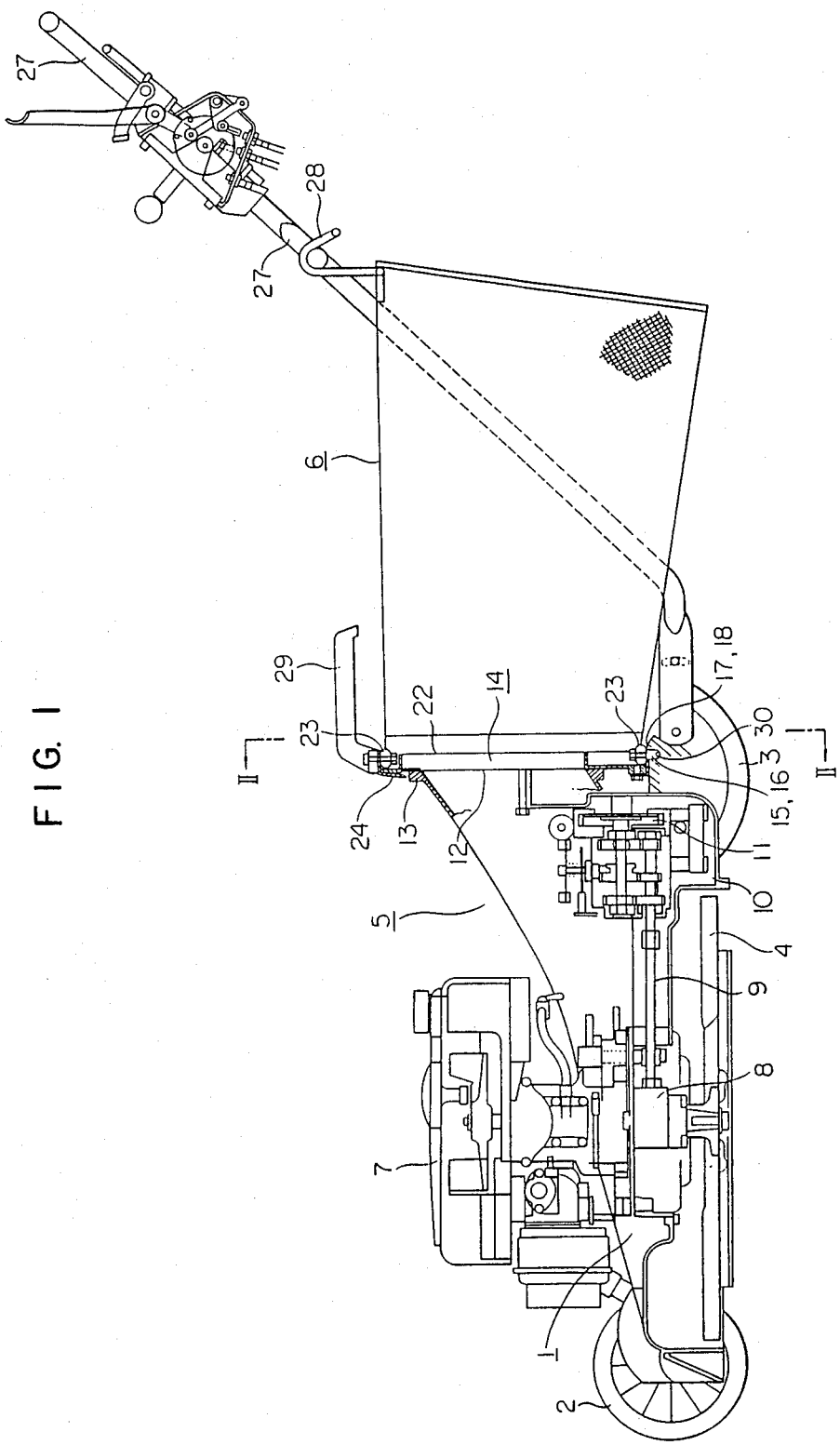
FIG. 1 is a side sectional view showing essential parts of the lawn mower.

The present invention will now be described on the basis of an embodiment illustrated in FIGS. 1 and 2.

The lawn mower of this embodiment has a machine body 1 and front and rear wheels 2 and 3 provided on both sides of the machine body 1 on which the lawn mower moves. A rotary mowing blade 4 is attached to a central location of the lower side of the machine body so as to mow grass, and grass mowed by the mowing blade 4 is discharged into a mowed grass catcher bag 6 through a duct 5 for discharging mowed grass, described later.

An engine 7 such as a gasoline engine is mounted in the middle portion of the machine body 1. The output shaft of the engine 7 extends downward and is connected to the mowing blade 4 through a clutch and brake device 8 to drive the blade.

A rotary shaft 9 has one end connected through gears to the output rotary shaft of the engine 7 and extends horizontally toward the rear of the machine body 1 so that its other end is connected to a driving device 11 for driving the rear wheels 3 which includes a transmission and clutch. The driving device 11 is mounted in a cup-shaped projecting portion 10 provided on the rear side of the machine body 1.

The mowed grass discharge duct 5 is disposed on one side of the top of the projecting portion 10. The duct 5 has one end which opens onto an upper portion of the peripheral edge of the mowing blade 4, and the other end of the duct extends obliquely upward toward the rear. The mowed grass catcher bag 6 is removably mounted on the opening at the rear end of the mowed grass discharge duct 5.

The duct 5 is formed of a suitable material such as plastic. The bag portion of the mowed grass catcher bag 6 is made of an air-permeable material such as cloth.

The outlet end of the duct 5, i.e., a mowed grass discharge port 12, is rectangular, and its periphery is defined by a frame portion 13 which is integral therewith. This discharge port 12 can be closed by a door 14. The door 14 and the frame portion 13 are provided with receptacle members 17 and 18, respectively, which are attached to lower edge portions of these members and are capable of receiving pins 15 and 16 projecting from lower edge portions of the bag 6, respectively. A hinge 19 is disposed on one side of the frame portion 13 of the mowed grass discharge port 12, and one side of the door 14 is pivotally mounted on the hinge 19 so as to be able to rotate, or turn leftward and rightward as viewed in FIG. 2, around the hinge 19 and thus to fully open or fully close the mowed grass discharge port 12. A helical spring 21 is provided on the hinge 19 so that the force of the spring 21 acts on the door 14 to constantly urge the door 14 toward a position in which the door 14 fully closes the discharge port 12.

Figure 3:
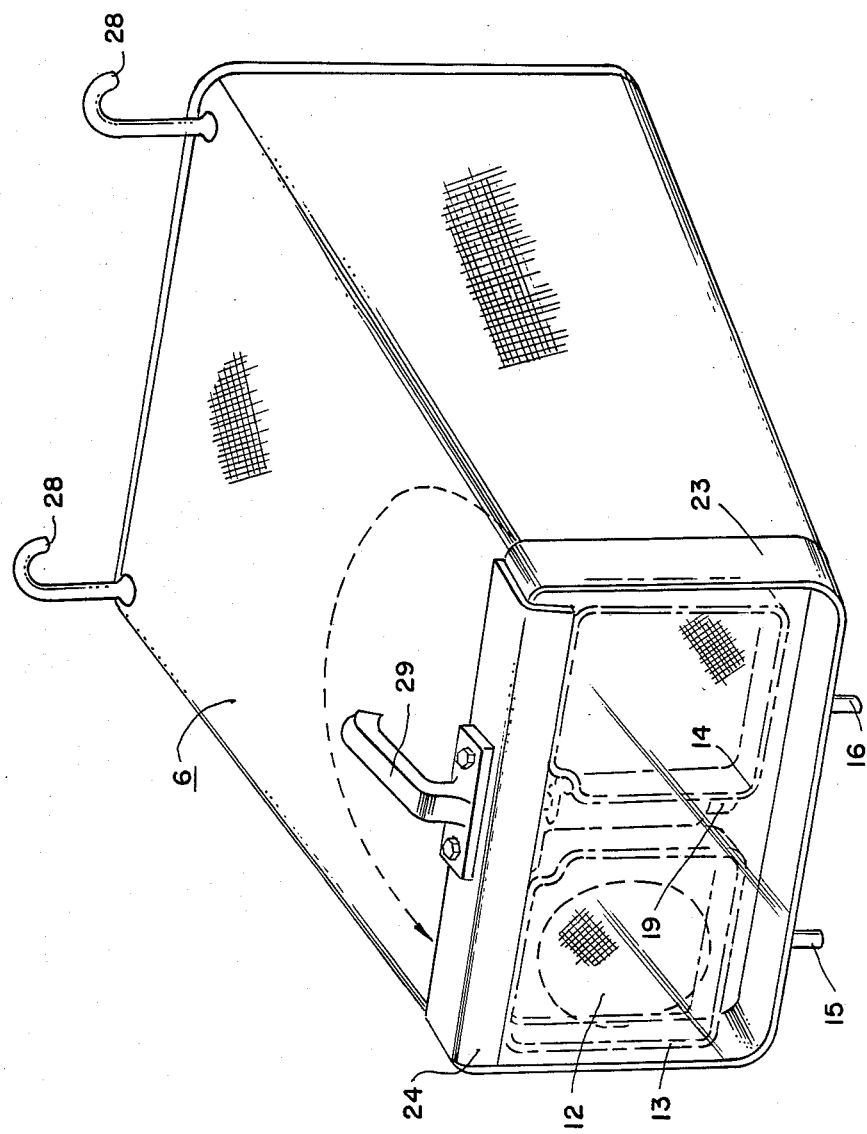
FIG. 3 is a perspective view of the door according to the present invention.

The mowed grass catcher bag 6 has an open end on which a frame member 23 having an opening 22 corresponding to the surface formed by the mowed grass discharge port 12 and the door 14 in the fully opened state is attached. The pins 15 and 16 project from the lower edge portions of the frame member 23 and are engageable with recesses 25 and 26 of the receptacle members 17 and 18 on the lower edge portions of the door 14 and the frame portion 13 of the discharge port 12. The bag 6 also has, at an upper portion of the frame member 23, a downwardly-extending spring plate portion 24 which is engageable with the upper ends of the door 14 and the frame portion 13 (see FIG. 3). In addition, the bag 6 has, at its rear upper edge, a projecting piece 28 which is engageable with a portion of a handle 27.

With the above-described arrangement, when a handle 29 provided on the front portion of the mowed grass catcher bag 6 is lifted upward, as viewed in FIG. 1, the spring plate portion 24 and the pins 15 and 16 are disengaged from the door 14 and the frame portion 13, thus separating the bag 6 from the machine body 1 and, simultaneously, releasing the door 14. Consequently, the door 14 is made to close the mowed grass discharge port 12 of the duct 5 by the force of the spring 21 of the hinge 19.

Figure 2:
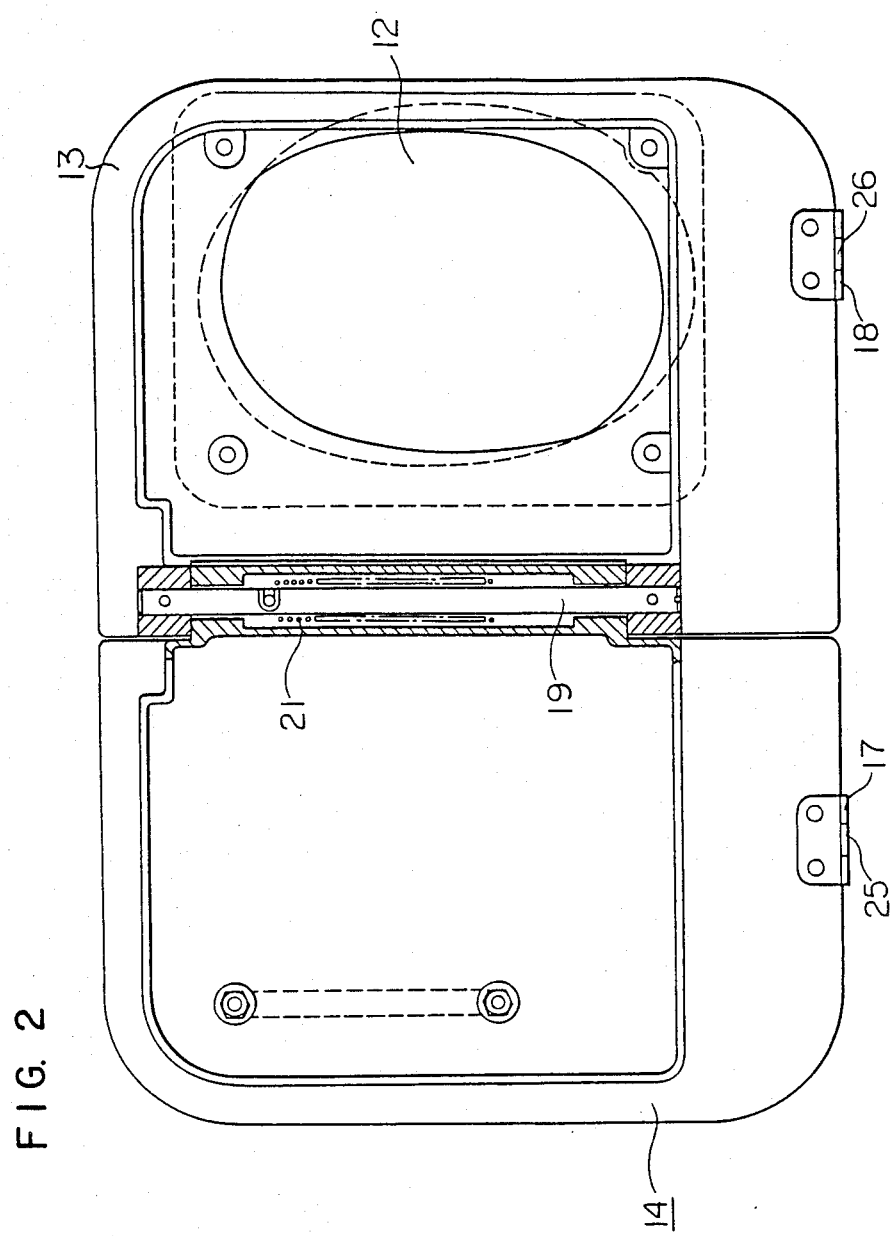
FIG. 2 is a fragmentary sectional view taken along the line II—II in FIG. 1 to show the door of the lawn mower in the opened state.

On the other hand, when it is required to mount the bag 6, the door 14 is turned in the direction in which it opens the mowed grass discharge port 12 against the force of the spring 21 to the fully-opened position as in FIG. 2, and is held at this position. With the door 14 in this position, the recess 25 of the receptacle member 17 provided on the door 14 registers with a hole 30 in the machine body 1, and while the pin 15 of the frame member 23 of the bag 6 is being inserted into the registered recess 25 and hole 30, the spring plate portion 24 on the upper side of the bag 6 is brought into engagement with the upper edges of the door 14 and the frame portion 13, inserting both of the pins 15 and 16 into the recesses 25 and 26 of the receptacle members 17 and 18. Consequently, when the door 14 is fixed to the machine body 1 and is held in the fully-opened position, the mowed grass catcher bag 6 is also fixed to the machine body 1 and held in position.

As described above, the door 14 acts to open and close the mowed grass discharge port 12 of the duct 5 and, also, is designed to enable the mounting and dismounting of the mowed grass catcher bag 6, while enabling the opening of the bag to be large.

What is claimed is:

1. A lawn mower having a machine body, a mowing blade rotatably provided in the lower side of said machine body, a duct for discharging mowed grass which is formed in the upper side of said lawn mower, and a mowed grass catcher bag mounted on the rear side of said duct for collecting mowed grass, said lawn mower further comprising a door which, when said mowed grass catcher bag is dismounted upwardly from the machine body, closes an opening at the rear end of said duct for discharging mowed grass, said door also serving as a member for mounting said mowed grass catcher bag when said door fully opens outwardly to open said opening of said duct, wherein one side portion of said door is pivotally supported by one side portion of said opening at said duct through a vertical hinge, and is constantly urged by a spring provided on said vertical hinge in the direction in which said door closes said opening of said duct automatically from the outside when said bag is dismounted.

2. A lawn mower according to claim 1, wherein said bag has pins projecting from lower edge portions thereof, and said bag is mounted onto said door fully opened outwardly and said opening of said duct by inserting one of said pins into a corresponding hole formed in a lower edge portion of said door.

3. A lawn mower according to claim 1, wherein said opening at the rear end of said duct has a frame portion formed around the periphery thereof, said bag has a spring plate portion at an upper portion thereof and pins projecting from lower edge portions thereof, and said frame portion of said opening of said duct and said door each have a receptacle member provided on a lower edge portion thereof, said bag being mounted onto said door and said opening of said duct by bringing said spring plate portion of said bag into engagement with the upper edge of said frame portion and simultaneously by inserting said pins of said bag into said receptacle members.

4. A lawn mower according to claim 1, wherein said bag has pins projecting from lower edge portions thereof, and said bag is mounted onto said door and said opening of said duct by inserting one of said pins into a corresponding hole formed in a lower edge portion of said door.

* * * * *